(12) United States Patent
Collins

(10) Patent No.: US 9,964,664 B2
(45) Date of Patent: May 8, 2018

(54) METHOD AND SENSING APPARATUS FOR ELEVATOR SAFETY SYSTEMS

(75) Inventor: Peter Collins, Oxford (GB)

(73) Assignee: Airdri Ltd, Oxfordshire (GB)

( * ) Notice: Subject to any disclaimer, the term of this patent is extended or adjusted under 35 U.S.C. 154(b) by 0 days. days.

(21) Appl. No.: 14/130,932

(22) PCT Filed: Sep. 3, 2012

(86) PCT No.: PCT/GB2012/052151
§ 371 (c)(1),
(2), (4) Date: Jan. 5, 2014

(87) PCT Pub. No.: WO2013/005062
PCT Pub. Date: Jan. 10, 2013

(65) Prior Publication Data
US 2014/0131557 A1    May 15, 2014

(30) Foreign Application Priority Data
Jul. 5, 2011    (GB) .................................. 1111450.1

(51) Int. Cl.
*G01V 8/20*        (2006.01)
*B66B 13/26*        (2006.01)

(52) U.S. Cl.
CPC ............... *G01V 8/20* (2013.01); *B66B 13/26* (2013.01)

(58) Field of Classification Search
CPC ... G01V 8/00; G01V 8/10; G01V 8/12; G01V 8/20; G01S 17/00; G01S 17/02; G01S 17/026; B66B 1/00; G08B 21/22
USPC ........... 250/221, 222.1, 493.1, 494.1, 195.1, 250/559.01, 559.04, 559.05, 559.07, 250/559.08, 559.12, 559.13, 559.15, 250/559.29, 336.1, 338.1, 340, 341.1, 250/341.7; 187/391–394, 414; 340/500, 340/540, 541, 545.1, 545.2, 545.3, 545.6, 340/545.7, 545.9, 552, 555–557, 573.1, 340/600
See application file for complete search history.

(56) References Cited

U.S. PATENT DOCUMENTS

| | | | |
|---|---|---|---|
| 6,167,991 B1 * | 1/2001 | Full et al. ...................... | 187/317 |
| 2001/0045328 A1 * | 11/2001 | Pustelniak et al. ........... | 187/317 |
| 2011/0056134 A1 * | 3/2011 | Zacchio et al. ................... | 49/31 |

\* cited by examiner

*Primary Examiner* — Tony Ko
(74) *Attorney, Agent, or Firm* — Michael D. Eisenberg

(57) ABSTRACT

A method and sensing apparatus for elevators that detects an intrusion into a volume defined relative to a path across an opening. The sensing apparatus has a closure member for the opening that can be controllably displaced to define a gap in the opening. A first group of at least two emitters of electromagnetic signals located on either the closure member or a boundary member are directed into the volume and a second group of at least two receivers for electromagnetic signals located on the opposite side of the gap to the emitters. The method causes at least one of the emitters to emit a primary beam along a first axis into the volume, allows at least one of the receivers to receive a secondary beam of radiation, and enables one or more of the receivers to provide an output signal into the network.

5 Claims, 4 Drawing Sheets

METHOD AND SENSING APPARATUS FOR ELEVATOR SAFETY SYSTEMS

TECHNICAL FIELD

This invention relates to a method and apparatus for sensing. It is concerned with providing a sensing system for a zone of variable size having a first boundary which can be moved relative to a second boundary of the zone. In the event a target enters the zone there can arise a need to modify such relative movement. For example in an elevator (also known as a lift) installation a door control situation can arise, when using currently available proximity sensors, sensitivity of the system fails for some reason to respond to the existence of an adverse condition. Photoelectric devices are extensively used in connection with elevator safety systems. How effectively a photoelectric device can be expected to perform in a given working environment is measured in terms of excess-gain. Excess gain is conveniently defined as the ratio of the light signal available in a given device location to the minimum light signal necessary to cause the device to function. The term 'photoelectric device' should be taken to include any device operable in response to electromagnetic radiation including, but is not limited to, infra-red radiation.

BACKGROUND

In the elevator industry safety is of major significance and a number of developments have arisen over the years. By way of example GB Patent GB 2,414,073 (Airdri Limited) describes a system for gap scanning in a door having a movable leading edge and a fixed location on an opposite side of the door opening between an open configuration wherein a first plurality of emitter units of beams of electromagnetic radiation located on one lateral boundary of a gap and a second plurality of receiver units for the beams is located on the other lateral boundary in which control means provider for the emitter and receiver units to establish an array of beams across the gap in which a beam from one emitter in the first plurality can be received by a complementary receiver in the second plurality; wherein the number of units in the one plurality is of the order of twice the number of units in the other plurality; the plurality containing the greater number of units being located relative to the side of the gap from which the door moves in moving from a position where the variable gap size is a maximum to where the variable gap is a minimum.

DISCLOSURE OF THE INVENTION

According to a first aspect of the present invention there is provided a method of detecting an intrusion into a volume defined relative to a path across an opening along which path a closure member for the opening can be controllably displaced to define a gap in the opening, the gap being bounded on one side by the closure member and on the other side to the one side by a boundary member; the volume including at least one threshold region on at least one side of the path; the volume having as a base the threshold region and rising above the threshold region; a first group of at least two emitters of electromagnetic signals located on either the closure member or the boundary and directed into the volume and a second group of at least two receivers for electromagnetic signals located on the opposite side of the gap to the emitters; emissions from the emitters being directed into the volume but not directly towards the receivers; the emitters and receivers forming part of a network including processing means which form a compound sensor for use in monitoring operation of the closure member and for defining sensitivity to an intrusion into a region or regions of the volume; each emitter being adapted to direct a primary beam of e.m. radiation into the volume; each receiver being adapted to receive a secondary beam generated by the reflection of a primary beam from a target intruding into the volume; the method comprising the steps of:

causing at least one of the emitters to emit a primary beam along a first axis into the volume;

allowing for at least one of the receivers to receive a secondary beam of radiation along a second axis from the volume; the secondary beam being generated by reflection of a primary beam from a target intruding into the volume; the secondary beam being generated in the volume by way of, but not constituted by, the or any primary beam from an emitter; and enabling one or more of the receivers to provide an output signal into the network of the compound receiver characteristic of the, or each, secondary beam detected by at least one of the receivers in the second group; and providing that where the compound sensor serves to establish:

that when an excess gain ratio is relatively small in an output signal from a single receiver caused by reception by the receiver of a secondary beam and the size of the gap is relatively large then the compound sensor functions so as to increase sensitivity of detection existing within a given predetermined region of the volume by comparison with sensitivity in another region or regions in the volume;

that when an excess gain ratio is relatively large in an output signal from a single receiver caused by reception by the receiver of a secondary beam and the size of the gap is reducing or small then the sensor functions so as to increase sensitivity of detection within more than one region of the volume by comparison with sensitivity in another region or regions in the volume.

According to a second aspect of the present invention there is provided apparatus for detecting intrusion into a volume defined relative to a path across an opening along which path a closure member for the opening can be controllably displaced to define a gap in the opening, the gap being bounded on one side by the closure member and on the other side to the one side by a boundary member; the volume including at least one threshold region on at least one side of the path; the volume having as a base the threshold region and rising above the threshold region; the apparatus comprising:

a first group of at least two emitters of electromagnetic signals located on either the closure member or the boundary and directed into the volume;

a second group of at least two receivers for electromagnetic signals located on the opposite side of the gap to the emitters; emissions from the emitters being directed into the volume but not directly towards the receivers;

a network comprising the emitters and receivers and including processing means which together form a compound sensor for use in monitoring operation of the closure member and for defining sensitivity to an intrusion into a region or regions of the volume;

means providing for each emitter to periodically direct a primary beam of e.m. radiation into the volume;

means providing for each receiver on receiving a secondary beam generated by the reflection of a primary beam from a target intruding into the volume; the secondary beam being generated in the volume by way of, but not constituted by, the or any primary beam from an emitter; and enabling one or more of the receivers to provide an output signal into the network of the compound sensor characteristic of the, or each, secondary beam detected by at least one of the receivers in the second group; and adapted to provide that where the compound sensor serves to establish that:

when an excess gain ratio is relatively small in an output signal from a single receiver caused by reception by the receiver of a secondary beam and the size of the gap is relatively large then the compound sensor functions so as to increase sensitivity of detection existing within a given predetermined region of the volume by comparison with sensitivity in another region or regions in the volume;

when an excess gain ratio is relatively large in an output signal from a single receiver caused by reception by the receiver of a secondary beam and the size of the gap is reducing or small then the sensor functions so as to increase sensitivity of detection within more than one region of the volume by comparison with sensitivity in another region or regions in the volume.

According to a first preferred version of the second aspect of the present invention there is provided apparatus according to the second aspect wherein the compound sensor functions so as to off-set the effect of zone geometry by providing for relatively low excess gain ratios to be maximised for any given gap size. Preferably the compound sensor is adapted to off-set the effect of zone geometry by providing for relatively high excess gain ratios to be minimised for any given gap size.

According to a third aspect of the present invention there is provided an installation incorporating at least two of the apparatus according to the second aspect of the present invention or of the first preferred version thereof.

BRIEF DESCRIPTION OF DRAWINGS

An exemplary embodiment of the invention will now be described with reference to the accompanying drawings of diagrams relating to a compound sensor for an elevator car in a shaft with an access opening governed by doors in which.

Figure 1:
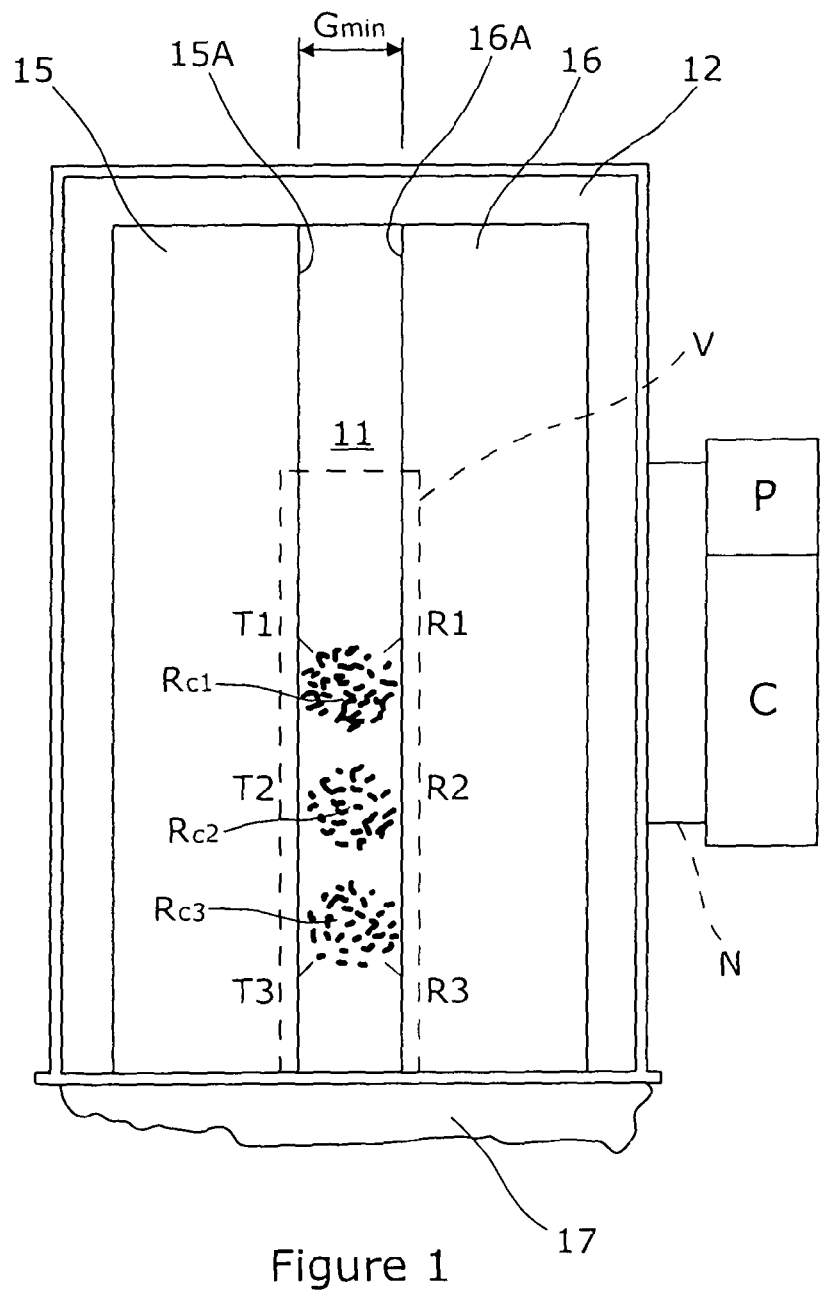
FIG. 1 shows the doors approaching their closed position.

As the components shown in the drawing differ only in their relative position the same references are used for the components in all four figures.

The figures show an elevator car 11 located in frame 12 of a door opening. The car 11 has a floor 14 and car doors 15, 16. In this example the doors 15, 16 are movable relative to the frame 12 by conventional driving means. In this case two doors 15, 16 are used that is to say both are movable. In an alternative installation only one door is provided governing the gap. The other side of the gap is defined by a non-moving boundary member for the gap.

Car doors 15, 16 (FIG. 4) are displaceable along a path P to govern access to the car 11 through a variable gap G. Access to the car 11 from floor 17 is by way of a region A in front of path P. The region A serves to define the bottom of a volume V shown in broken outline in FIGS. 1 to 3 which extends upwardly from region A.

Figure 4:
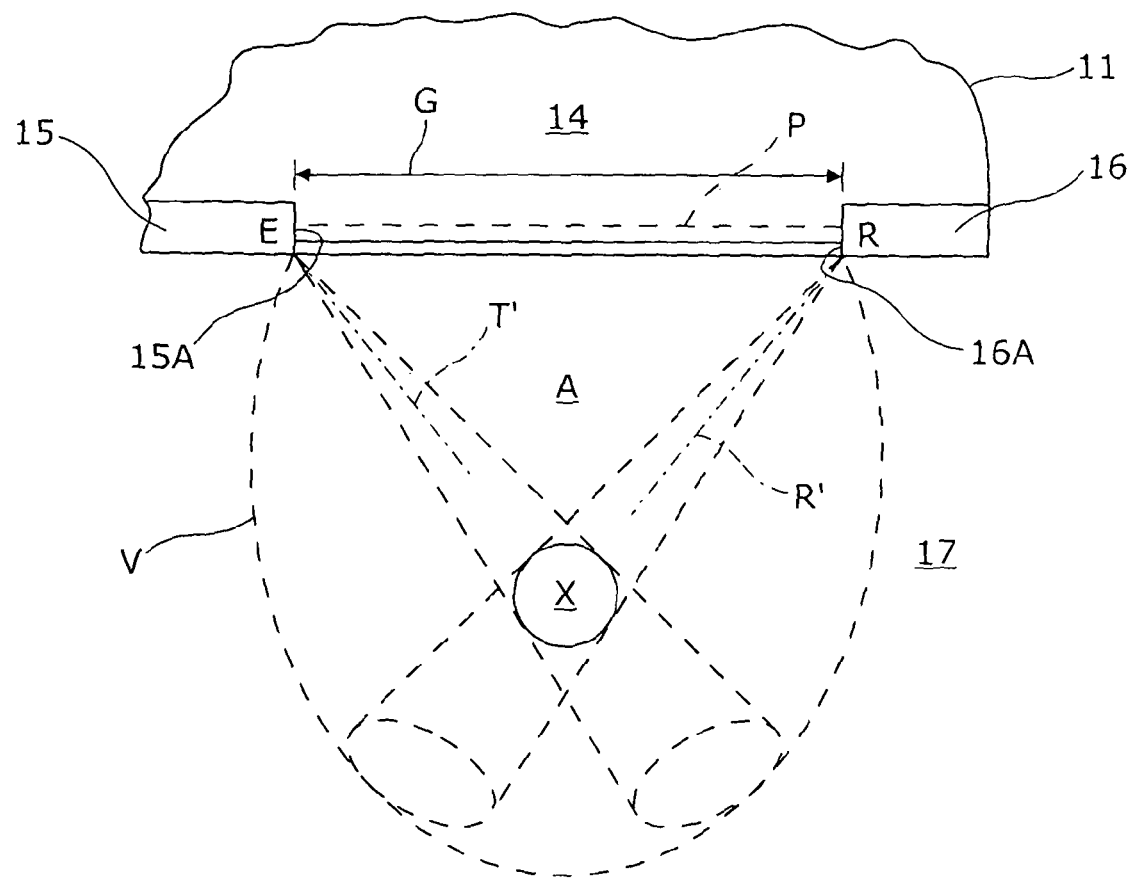
FIG. 4 is a plan view of section II-II of FIG. 2

The car door 15 is equipped at its leading edge 15A with three vertically spaced emitters T1-T3 each adapted to emit polar radiation (in this case of infra-red radiation) into the volume V above region A along axis T' (FIG. 4). Each beam is of conical form widening as the distance from its emitter increases.

The door 16 has three vertically spaced receivers R1-R3 each adapted to receive beams reflected out of volume V along axis R'. Axis T' is not coaxial with axis R'. That is to say when in operation the receivers R1-R3 do not receive beams directly from any of emitters T1-T3. The emitters and receivers are (FIG. 4) turned outwardly from the plane of the doors 15, 16 to face into the volume V. The emitters and receivers are incorporated in a network N which includes a processor P and control unit C the whole forming a compound sensor S functioning as will be described hereafter.

With a target X (FIG. 4) entering into the volume V at least one of emitted beams from emitters E1-E3 will be reflected from the target X generating a secondary beam falling on one or more of the receivers R1-R3. As result there will be change in the radiation received by one or more of the receivers and so in the output signal from each of the receivers fed into the network N. This enables the position occupied by the target X to be defined in relation to the gap geometry by the control unit C. The definition will vary as the gap G reduces in size as the doors 15, 16 close.

The shape of the region A is selected for the particular application involved. In this case the configuration of region A provides for identifying a target moving towards the car 11 from the stage floor 17.

In an alternative embodiment the zone corresponding in function to the region A of this embodiment is shaped so as to project further into the floor 14 of the car 11 to provide for identification of a target moving into the region A from the interior of the car 16.

The region A serves to define a lower boundary for a three dimensional sensing volume V to be scanned by means of the compound sensor system so making the system able to detect the entry of target X. The system provides detecting intrusion by a target able to enter the aperture G whether low or high. This provision of a three dimensional sensing system serves to distinguish it from earlier developments which have been effectively a two dimensional arrangement relying on line of sight beam operation between emitter and receiver arrays.

The exemplary embodiment provides for each door to be equipped with three emitters and three receivers. It is believed that for certain applications this number could be reduced to two of each while still providing an adequate detection system.

The exemplary embodiment demonstrates how more significant regions of the volume can be provided with the highest definition at their centre with definition reducing as the distance from the centre of the region increases. The focus of the significant region is based on establishing a function of the excess gain ratio at a given point.

Control of the closing of the car doors 15, 16 is regulated to ensuring that the likelihood of their trapping a target X between them is reduced to a minimum by providing for the doors 15, 16 in approaching their near closed configuration (FIG. 1) to be governed by way of a processor incorporated in control unit F which provides for increasing sensitivity in more than one region in the volume V as the gap reduces in size.

Figure 3:
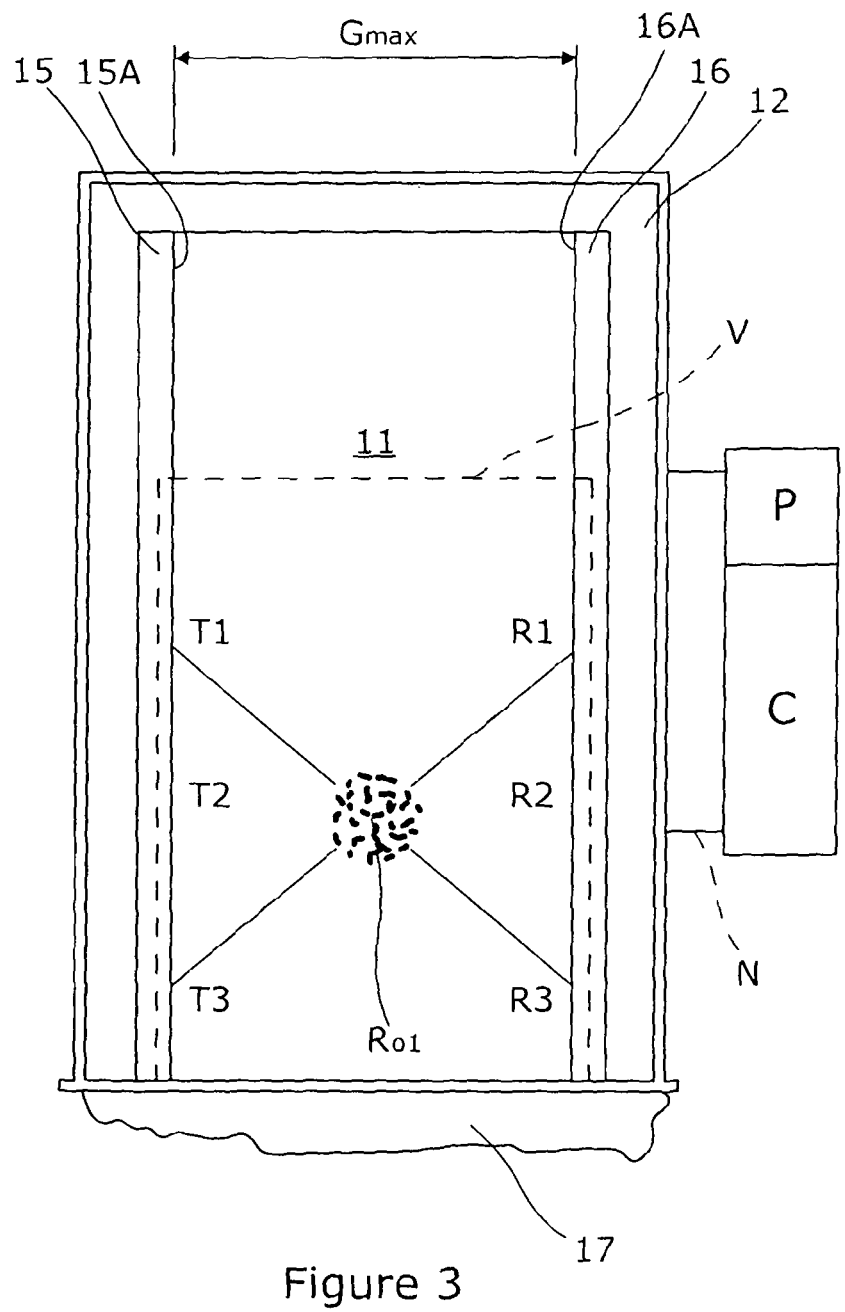
FIG. 3 shows the doors approaching their fully open position.

FIG. 3 shows the car doors 15, 16 with a maximum gap $G_{max}$ between their respective leading edges 15A, 16A. Control unit C provides for each transmitter T1, T2, T3 to emit a signal beam of polar infra red radiation in the direction of axis A. The array and the processor F function to define a significant sensing region $R_{o1}$ with an optimised, relatively high, signal to noise ratio. In the gap $G_{max}$ outside the sensing region $R_{o1}$ the signal to noise ratio is relatively low.

Figure 2:
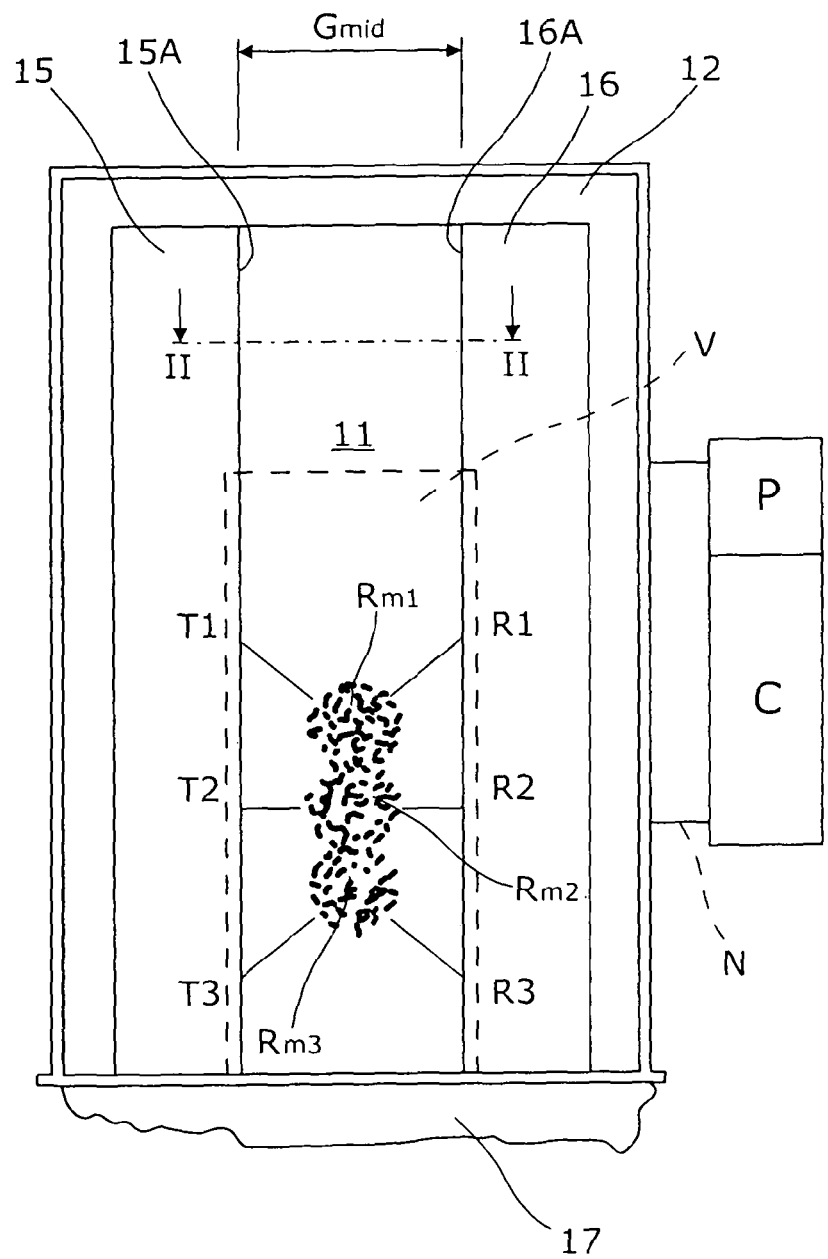
FIG. 2 shows the doors in a half open position.

FIG. 2 shows the doors 15, 16 mid-way through a closing sequence with gap Gmid and with no target in the gap the control system is caused to function so as to define three sensing regions Rmi. Rm2, Rm3 each with an optimised, relatively high, signal to noise ratio by comparison with the remaining region of the volume. For this application these sensing areas have been found to correspond to those in which at least one target X is most likely to arrive during normal passenger lift operation. Typically they could be caused by an individual entering or leaving the car and include articles whish are carried, drawn or pushed. In such an event the reflected secondary beam caused by reflection of the primary beam from each transmitter T1, T2, T3 arrives at each receiver R1, R2, R3 resulting in a change in the output signal of each receiver into the network from the null sensing condition arising when no target X is present. This change is sensed by way of the compound sensor and processor F functions to increase sensitivity in the three regions to cause the driving means to stop movement of doors 15, 16. If necessary the doors 15, 16 having stopped could be re-opened. Once the target X has been removed the compound sensor operates to restore door operation to normal.

FIG. 1 shows the leading edges 15A, 16A of the doors 15, 16 approaching their closed position. At this stage in this embodiment the network and processor F function so as to define spaced sensing regions $R_{c1}$, $R_{c2}$, $R_{c3}$ with an optimised signal to noise ratio. These sensing areas are spaced further apart than the corresponding regions in FIG. 2. This increased vertical definition of regions of high signal to noise ratio in the configuration of the doors is where experience suggests trapping of an obstacle is most likely to occur. In this closing configuration the control unit C functions to cause the doors 15, 16 to be drawn apart to avoid closure of the doors on an obstacle.

INDUSTRIAL APPLICABILITY

The present invention provides an economical viable installation for, but not limited to, elevator systems to provide for safe operation even with a user who is inexperienced or inattentive during boarding or leaving.

What is claimed is:

1. A method of detecting an intrusion into a volume defined relative to a path across an opening along which path a closure member for the opening can be controllably displaced to define a gap in the opening, the gap being bounded on one side by the closure member and on the other side to the one side by a boundary member; the volume including at least one threshold region on at least one side of the path; the volume having as a base the threshold region and rising above the threshold region; a first group of at least two emitters of electromagnetic signals located on either the closure member or the boundary and directed into the volume and a second group of at least two receivers for electromagnetic signals located on the opposite side of the gap to the emitters; emissions from the emitters being directed into the volume but not directly towards the receivers; the emitters and receivers forming part of a network including processing means which form a compound sensor for use in relation to operation of the closure member and for defining sensitivity to an intrusion into a region or regions of the volume; each emitter being adapted to direct a primary beam of electromagnetic radiation into the volume; each receiver being adapted to receive a secondary beam generated by the reflection of a primary beam from a target intruding into the volume; the method comprising the steps of:
  causing at least one of the emitters to emit a primary beam along a first axis into the volume;
  allowing for at least one of the receivers to receive a secondary beam of radiation along a second axis from the volume; the secondary beam being generated by reflection of a primary beam from a target intruding into the volume; the secondary beam being generated in the volume by way of, but not constituted by, the or any primary beam from an emitter; and
  enabling one or more of the receivers to provide an output signal into the network to establish that:
  when an excess gain ratio is relatively small in an output signal from a single receiver caused by reception by the receiver of a secondary beam and the size of the gap is relatively large then the compound sensor functions so as to increase sensitivity of detection existing within a given predetermined region of the volume by comparison with sensitivity in another region or regions in the volume;
  when an excess gain ratio is relatively large in an output signal from a single receiver caused by reception by the receiver of a secondary beam and the size of the gap is reducing or small then the sensor functions so as to increase sensitivity of detection within more than one region of the volume by
  comparison with sensitivity in another region or regions in the volume.

2. An apparatus for detecting intrusion into a volume defined relative to a path across an opening along which path a closure member for the opening can be controllably displaced to define a gap in the opening, the gap being bounded on one side by the closure member and on the other side to the one side by a boundary member; the volume including at least one threshold region on at least one side of the path; the volume having as a base the threshold region and rising above the threshold region; the apparatus comprising:
  a first group of at least two emitters of electromagnetic signals located on either the closure member or the boundary and directed into the volume; a second group of at least two receivers for electromagnetic signals located on the opposite side of the gap to the emitters; emissions from the emitters being directed into the volume but not directly towards the receivers;
  a network comprising the emitters and receivers and including processing means which together form a compound sensor for use in relation to operation of the closure member and for defining sensitivity to an intrusion into a region or regions of the volume;
  means providing for each emitter to periodically direct a primary beam of electromagnetic radiation into the volume;
  means for providing for each receiver receiving a secondary beam generated by a primary beam emitted by one of the at least two emitters and reflected from a target intruding into the volume and for enabling at least one of the at least two receivers to provide an output signal indicative of a compound sensor characteristic of the secondary beam, wherein the compound sensor is adapted to establish that:

when an excess gain ratio is relatively small in an output signal from a single receiver caused by reception by the receiver of a secondary beam and the size of the gap is relatively large then the compound sensor functions so as to increase sensitivity of detection existing within a given predetermined region of the volume by comparison with sensitivity in another region or regions in the volume;

when an excess gain ratio is relatively large in an output signal from a single receiver caused by reception by the receiver of a secondary beam and the size of the gap is reducing or small then the sensor functions so as to increase sensitivity of detection within more than one region of the volume by comparison with sensitivity in another region or regions in the volume.

3. The apparatus as claimed in claim 2 wherein the compound sensor functions so as to off-set the effect of zone geometry by providing for relatively low excess gain ratios to be maximised for any given gap size.

4. The apparatus as claimed in claim 3 wherein the compound sensor is adapted to off-set the effect of zone geometry by providing for relatively high excess gain ratios to be minimised for any given gap size.

5. An installation incorporating at least two of the apparatus as claimed in claim 2.

* * * * *